July 19, 1949.  D. F. FRASER  2,476,540
METHOD OF REMOVING FLASH FROM MOLDED ARTICLES
Filed April 20, 1948
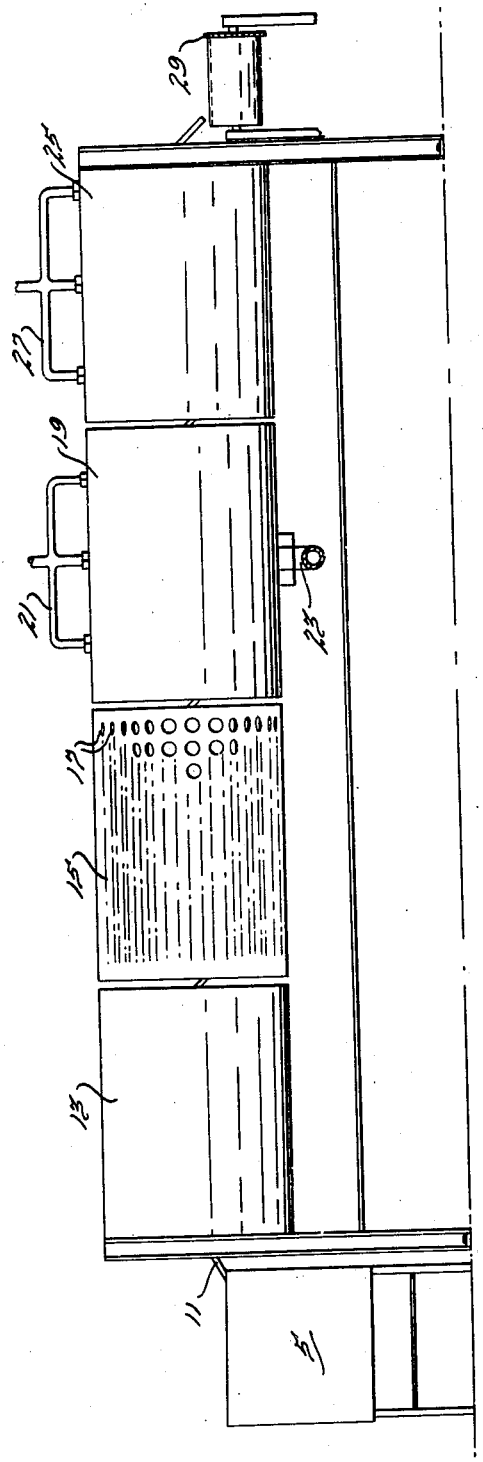
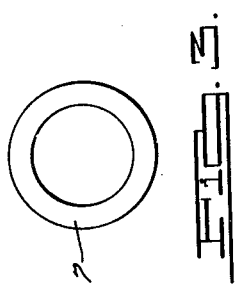
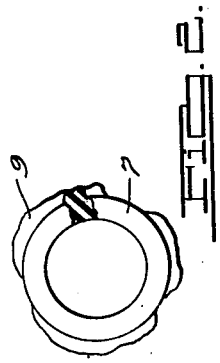
INVENTOR.
Donald F. Fraser
BY
Harness, Dickey & Pierce
ATTORNEYS.

Patented July 19, 1949

2,476,540

UNITED STATES PATENT OFFICE 2,476,540

METHOD OF REMOVING FLASH FROM MOLDED ARTICLES

Donald F. Fraser, Hillsdale, Mich., assignor to Monroe Auto Equipment Company, Monroe, Mich., a corporation of Michigan Application April 20, 1948, Serial No. 22,165

3 Claims. (Cl. 51—282)

This invention relates to an improved method of removing flash from molded articles, such as rubber parts or the like, and more particularly to a continuous process for transferring molded articles having flash thereon into a finished and clean state in which they are adapted for immediate use.

Articles which are molded, such as rubber, very generally have flash thereon which must be removed before they are in a finished state. It is, of course, too expensive and laborious to cut the flash away from the articles, and therefore methods have been developed in which the articles are subjected to subnormal temperatures, so as to become brittle, and then tumbled so as to remove the flash or fins therefrom. In one such method that has been devised, the molded articles are rotated in a tumbling barrel with Dry Ice so as to freeze the articles and at the same time knock off the flash. Still another method has been to tumble the articles in a tumbling apparatus which is partly filled with an inert, cold liquid so as to freeze the articles and knock off the flash. The first of these methods is unsatisfactory in that it is extremely inefficient to transfer heat from one solid, Dry Ice, to another solid, the articles, thus necessitating the use of a large amount of Dry Ice in order to sufficiently freeze the molded articles to a point where the flash becomes brittle and will break off during the tumbling operation. The second of these methods has proved unsatisfactory in that, while higher cooling efficiencies are obtained, a longer time is required to break off the brittle flash because the articles are being tumbled in a liquid, and because the broken pieces of flash adhere to the molded articles and are difficult to remove.

It is an object of this invention to provide a tumbling method for removing flash from molded parts which overcomes the difficulties of both of the methods enumerated above.

It is a further object of this invention to provide a method for removing flash from molded elastic articles which incorporates a continuous process for freezing the articles, removing the flash therefrom, and washing and cleaning the articles so that they are in a finished state and adapted for use without any further work being performed thereon.

Other objects of this invention will become apparent from the following detailed description taken in conjunction with the accompanying drawing in which:

Figure 1 is a diagrammatical view of a continuous tumbling apparatus for performing the method of this invention;

Fig. 2 is a front elevational view, with parts broken away in section, of an illustrative molded article with the flash thereon; and Fig. 3 is a front elevational view of the molded article shown in Fig. 2 after it has been subjected to the process or method of this invention.

Referring now to the drawing and more particularly to Fig. 1 which illustrates diagrammatically one possible arrangement for carrying out the method of this invention, it will be seen that a container 5 is provided which is filled, or partially filled, with an inert liquid, such as alcohol, which is cooled to a subnormal temperature by Dry Ice or refrigerating coils. The molded articles 7, which come from the molding machine with the flash 9 thereon, as illustrated in Fig. 2, are placed in the alcohol in the container 5 and are cooled to subnormal temperatures wherein the flash 9 becomes very brittle but the articles 7 themselves do not become brittle enough to break during the tumbling operation. After the articles are sufficiently cooled in the container 5, they are automatically conveyed by any suitable means, such as a conveyor 11, into a rotating tumbling barrel 13. The articles are then tumbled in the rotating tumbling barrel 13 for a sufficient period of time and then are conveyed by any suitable means into a second tumbling barrel 15 which has perforated side walls indicated at 17. The flash which has been broken off of the articles 7 can then pass through the perforations 17 in the tumbling barrel 15 so that only the articles 7, with the flash 9 removed, emerge from the tumbling barrel 15.

The articles are conveyed by any suitable mechanism from the tumbling barrel 15, after a predetermined time, into a third rotating tumbling barrel 19 in which the articles are subjected to a hot water cleaning bath. This may be accomplished in several different ways, such as by partially filling the tumbling barrel 19 with hot water or by spraying hot water into the tumbling barrel through suitable conduits 21. The water, of course, will be drained from the tumbling barrel 19 through any suitable drain 23. After the molded articles have been cleaned in the tumbling barrel 19, they are automatically conveyed in any suitable manner to a fourth tumbling barrel 25 in which they are dried by means of hot air or the like. Any suitable drying means may be incorporated and, as one illustrative method, hot air may be blown into the tumbling barrel 25 through conduits 27. The clean, dry molded articles 7 are then automatically conveyed from the tumbling barrel 26 onto a suitable conveyor 29 where an inspector may check the finished articles to make sure that they meet the necessary requirements.

It will thus be appreciated that the method of this invention is a continuous one in which the molded articles are cooled, tumbled, cleaned and dried in one continuous process. It likewise will be appreciated that this method is extremely efficient and economical due to the fact that the molded articles are first cooled in an inert liquid which, as previously pointed out, is the most efficient way to cool parts, and then the molded articles are moved out of contact with the liquid and tumbled in a barrel, or the like, by themselves. Thus this method overcomes the difficulties in the previous methods for removing flash from molded articles by tumbling, and provides a very economical, efficient and simple method for transferring unfinished molded articles into a finished, cleaned state wherein they are adapted for immediate use without the performance of any further work thereon.

I claim:

1. A method for removing flash from molded elastic articles incorporating the steps of cooling the articles to subnormal temperatures in an inert liquid to a temperature at which the flash becomes brittle, automatically transporting the articles out of the inert liquid and into a tumbling apparatus, tumbling the articles until the flash is removed therefrom, cleaning the articles, drying the articles and discharging the articles from the tumbling apparatus.

2. A method of removing flash from molded articles in a continuous process which includes the steps of placing the articles in an inert liquid and cooling the same to a subnormal temperature at which the flash becomes brittle, moving the articles out of the inert liquid and into a tumbling apparatus, tumbling the articles until the flash is removed therefrom, moving the articles to a second tumbling apparatus and tumbling the articles so that the flash is discharged from said tumbling apparatus, conveying the articles to a third tumbling apparatus and washing the articles in the third tumbling apparatus, conveying the articles to a fourth apparatus and drying the articles in the fourth tumbling apparatus and discharging the articles from the tumbling apparatus in a completely finished, cleaned and dried state.

3. A method of removing flash from molded articles including the steps of placing the articles in an inert liquid and cooling the same at a subnormal temperature at which the flash will become brittle, and removing the articles from the inert liquid and tumbling them separately in a container to remove and break off the flash.

DONALD F. FRASER.

REFERENCES CITED

The following references are of record in the file of this patent:

UNITED STATES PATENTS

| Number | Name | Date |
|---|---|---|
| 1,422,309 | Schweinsberg et al. | July 11, 1922 |
| 1,510,504 | Schweinsberg | Oct. 7, 1924 |
| 2,347,464 | Cuno | Apr. 25, 1944 |
| 2,380,653 | Kopplin | July 31, 1945 |
| 2,402,967 | Lubenow | July 2, 1946 |

FOREIGN PATENTS

| Number | Country | Date |
|---|---|---|
| 524,519 | Great Britain | Aug. 8, 1940 |